United States Patent
Yang et al.

(10) Patent No.: US 8,385,399 B2
(45) Date of Patent: Feb. 26, 2013

(54) METHOD FOR IMPULSE NOISE MITIGATION

(75) Inventors: Shu-Fa Yang, Nantou County (TW); Min-Chieh Chen, Hsinchu (TW); Ching-Kae Tzou, Hsinchu (TW)

(73) Assignee: Ralink Technology Corp., Jhubei, Hsinchu County (TW)

( * ) Notice: Subject to any disclaimer, the term of this patent is extended or adjusted under 35 U.S.C. 154(b) by 412 days.

(21) Appl. No.: 12/725,592

(22) Filed: Mar. 17, 2010

(65) Prior Publication Data

US 2011/0228836 A1     Sep. 22, 2011

(51) Int. Cl.
*H03H 7/30*    (2006.01)

(52) U.S. Cl. .......... 375/232; 375/285; 375/346

(58) Field of Classification Search .......... 375/260, 375/267, 285, 346, 232
See application file for complete search history.

(56) References Cited

U.S. PATENT DOCUMENTS

2002/0172146 A1*  11/2002  Wu et al. .................. 370/208
2006/0222098 A1*  10/2006  Sedarat et al. ............ 375/260

\* cited by examiner

*Primary Examiner* — Shuwang Liu
*Assistant Examiner* — David Huang
(74) *Attorney, Agent, or Firm* — Winston Hsu; Scott Margo (57) ABSTRACT

A method of noise mitigation in a multi-carrier communication system includes receiving a signal from a decision device, determining whether synchronization symbol update is enabled, updating at least one of frequency-domain equalizer (FEQ) coefficients or digital echo canceller (DEC) coefficients in synchronization symbol periods if the synchronization symbol update is enabled, determining whether data symbol update is performed if the synchronization symbol update is not enabled, determining whether a flag associated with the signal is set if the data symbol update is not performed, and updating at least one of FEQ or DEC coefficients associated with the signal in synchronization symbol periods if the flag is set.

19 Claims, 7 Drawing Sheets

METHOD FOR IMPULSE NOISE MITIGATION

BACKGROUND OF THE INVENTION

The present invention relates generally to multi-carrier communication and, more particularly, to a method for mitigating impulse noise and interference in a multi-carrier communication system.

Market demand for high data rates plays an important role in advanced communications. With the development of "digital signal processor" (DSP) and "very large scale integrated circuit" (VLSI) technology, the demand for video/audio services, consumer services, Internet, and Word Wide Web (WWW) grows exponentially. An advanced communication technology is needed to satisfy the requirement. Moreover, it may be important to take advantage of existing communication infrastructure to transfer data so that servers and clients can save the cost for building a new network. "Asymmetric digital subscriber line" (ADSL) has become a popular application because ADSL technology satisfies the demand for more throughput based on a currently available infrastructure. For example, ADSL may share the same line as a telephone line by using higher frequencies than the voice band.

In the ADSL and next-generation xDSL systems, the adopted modulation approach is discrete multi-tone (DMT) technology, which is a multi-carrier modulation scheme that divides a channel into sub-channels. A DMT communication system may carry information from a transmitter to a receiver over a number of sub-carriers or tones. Due to channel dispersion or multi-path effect, interference or noise may corrupt the information signal on each tone as the signal travels through the communication channel (i.e., twisted pair telephone line) to the receiver. To ensure a reliable communication between transmitter and receiver, each tone may carry a limited number of data bits. The number of data bits that a tone can carry may vary from tone to tone and depend on the relative power of the information-carrying signal and the corrupting noise or interference on that particular tone.

In addition to additive white Gaussian noise (AWGN), near-end crosstalk (NEXT) and far-end crosstalk (FEXT), interference from alternating-current (AC) power lines is a significant source of impulsive noise on twisted pair phone lines. Furthermore, electric motors, light dimmer switches, hair dryers, malfunctioning light bulbs, lighting and the like are typical examples of environmental interference sources. The interference from impulse noise sources tends to be periodically impulsive, that is, relatively large in power level and short in duration. In the presence of such repetitive impulsive or burst noise sources, if their effects are not properly mitigated, system parameters may deviate from their nominal or optimum values. If the repetition rate of such impulsive noise is greater than the convergence rate of these system parameters' adaptation or estimation, deviations of the system parameters may accumulate and thus system performance may severely degrade.

Many mechanisms and approaches have been proposed to address the issue of impulse noise. Such mechanisms may focus on impulse noise detection, impulse noise management, or system parameter settings and adaptation based on monitored impulse noise characteristics so as to protect data and packets from impulse noise, assuming that receiver operations or signal reception mechanisms are not severely affected by impulse noise. In other words, the receiver's operations and timing are assumed to be not affected by impulse noise, either weak or strong. Such an assumption may not be true in real applications, especially in the presence of strong impulse noise or interference. The interference or impulse noise may severely degrade the quality of DSP and/or channel estimation for the setting of system parameters during the link setup stage, or significantly affect the adaptation or adjustment of system parameters in the showtime stage of data reception and transmission. It may therefore be desirable to have apparatuses and methods to prevent or reduce the impact of impulsive noise effects on system parameters and protect receiver operations in signal reception from corruption by impulse noise during link setup and showtime stages.

BRIEF SUMMARY OF THE INVENTION

Examples of the present invention may provide an apparatus for noise mitigation in a multi-carrier communication system. The apparatus includes a filter to receive a signal from an analog front end, a time-domain equalizer (TEQ) coupled with the filter, a fast Fourier transform (FFT) module, a frequency-domain equalizer (FEQ) coupled with the FFT module, a slicer to serve as a decision device, and a controller to calculate the power of signal at least one of an input of the filter, an input of the TEQ, an output of the TEQ, an output of the FFT module, an output of the FEQ or an output of the slicer and compare at least one of the power of the at least one signal with a respective threshold so as to determine whether impulse noise occurs, wherein the controller is configured to disable adaptation of system parameters in at least one of the FEQ, a phase-lock loop (PLL) or a digital echo canceller (DEC) when impulse noise is detected.

Some examples of the present invention may also provide an apparatus for noise mitigation in a multi-carrier communication system. The apparatus includes a filter to receive a signal from an analog front end, a time-domain equalizer (TEQ) coupled with the filter, and a controller to calculate the power of signal at least one of an input of the filter, an input of the TEQ or an output of the TEQ and compare at least one of the power of the at least one signal with a respective threshold so as to determine whether impulse noise occurs in the time domain, wherein the controller is configured to disable adaptation of system parameters in at least one of a frequency-domain equalizer (FEQ), a phase-lock loop (PLL) or a digital echo canceller (DEC) when impulse noise is detected.

Examples of the present invention may still provide an apparatus for noise mitigation in a multi-carrier communication system. The apparatus includes a fast Fourier transform (FFT) module, a frequency-domain equalizer (FEQ) coupled with the FFT module, a slicer to serve as a decision device, and a controller to calculate the power of signal at least one of an output of the FFT module, an output of the FEQ or an output of the slicer and compare at least one of the power of the at least one signal with a respective threshold so as to determine whether impulse noise occurs in the frequency domain, wherein the controller is configured to disable adaptation of system parameters in at least one of the FEQ, a phase-lock loop (PLL) or a digital echo canceller (DEC) when impulse noise is detected.

Examples of the present invention may further provide a method of noise mitigation in a multi-carrier communication system. The method includes receiving a signal from a decision device, determining whether synchronization symbol update is enabled, updating at least one of frequency-domain equalizer (FEQ) coefficients or digital echo canceller (DEC) coefficients in synchronization symbol periods if the synchronization symbol update is enabled, determining whether data symbol update is performed if the synchronization symbol update is not enabled, determining whether a flag associated with the signal is set if the data symbol update is not performed, and updating at least one of FEQ or DEC coefficients associated with the signal in synchronization symbol periods if the flag is set.

Some examples of the present invention may also provide a method of noise mitigation in a multi-carrier communication system. The method includes receiving a signal from a decision device, identifying that synchronization symbol update is not enabled, determining whether a flag associated with the signal is set if data symbol update is not performed, updating at least one of frequency-domain equalizer (FEQ) coefficients or digital echo canceller (DEC) coefficients associated with the signal in synchronization symbol periods if the flag is set, determining whether the power of instant error associated with the signal exceeds a threshold if the data symbol update is to be performed, determining whether the flag associated with the signal is set if the power of instant error is smaller than the threshold, and updating at least one of FEQ or DEC coefficients associated with the signal in the data symbol periods if the flag is not set.

Examples of the present invention may still provide a method of noise mitigation in a multi-carrier communication system including a filter, a time-domain equalizer (TEQ), a fast Fourier transform (FFT) module, a frequency-domain equalizer (FEQ) and a slicer. The method includes calculating the power of signal at least one of an input of the filter, an input of the TEQ, an output of the TEQ, an output of the FFT module, an output of the FEQ or an output of the slicer, comparing the power of the at least one signal with a respective threshold, determining that impulse noise is detected when at least one of the power of the at least one signal exceeds its respective threshold, and disabling adaptation of system parameters in at least one of the FEQ, a phase-lock loop (PLL) or a digital echo canceller (DEC) when impulse noise is detected.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1A:
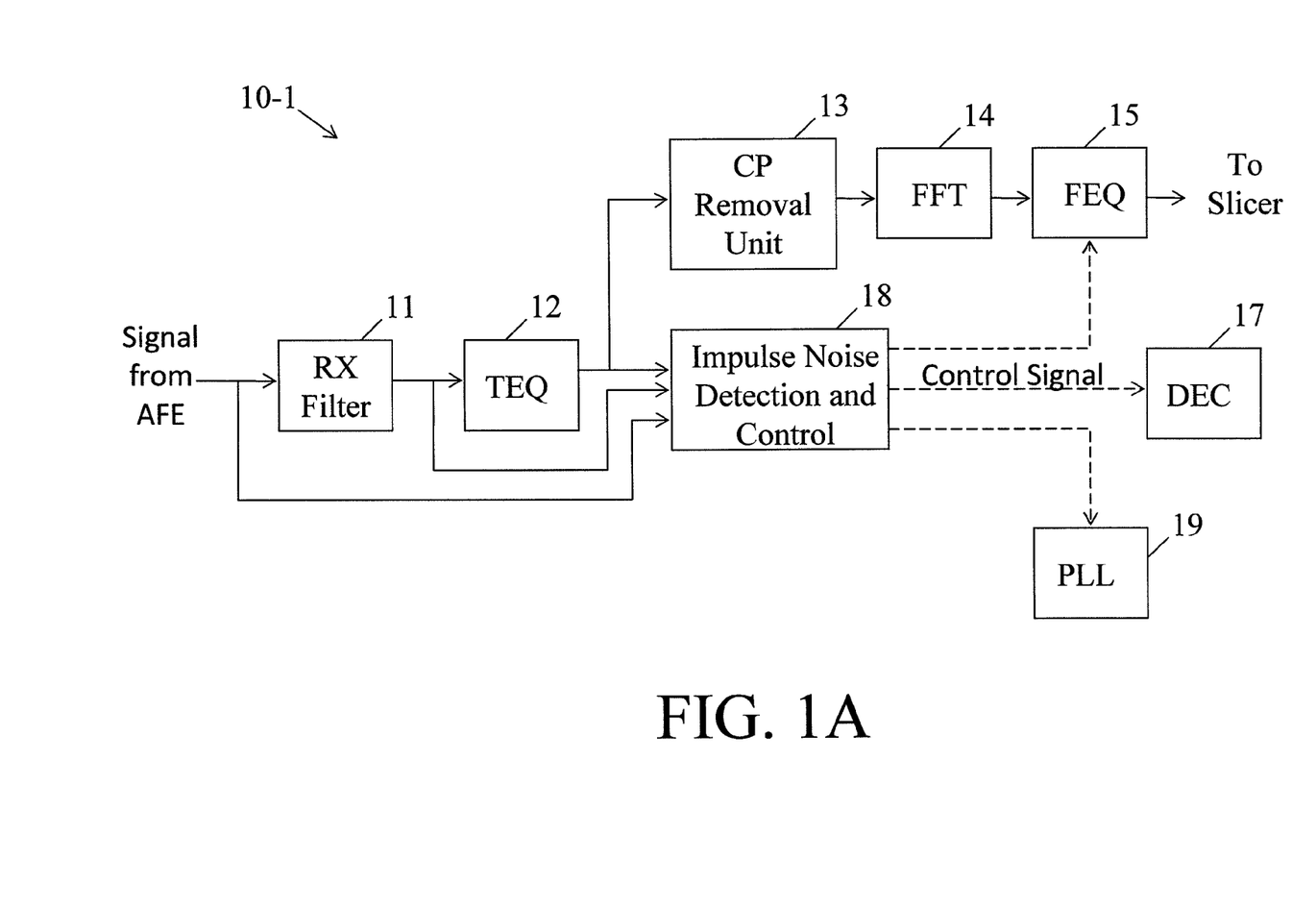
FIG. 1A is a block diagram of an apparatus for impulse noise mitigation in the time domain in a multi-carrier communication system in accordance with an example of the present invention.

FIG. 1A is a block diagram of an apparatus 10-1 for impulse noise mitigation in the time domain in a multi-carrier communication system in accordance with an example of the present invention. Referring to FIG. 1A, the apparatus 10-1 may include a digital receiver filter 11, a time-domain equalizer (TEQ) 12, a cyclic prefix (CP) removal unit 13, a fast Fourier transform (FFT) module 14, a frequency-domain equalizer (FEQ) 15 and a controller 18 capable of impulse noise detection. The controller 18 may be configured to detect impulse noise in the time domain and, when impulse noise is detected, disable the adaption or update of system parameters so that the impact of impulse noise on the system parameters may be alleviated. The system parameters may include but are not limited to TEQ coefficients, coefficients of FEQ and digital echo canceller (DEC), phase-lock loop (PLL) control word for timing adjustment, and power estimation of decision error at a slicer output. The functions and calculations of exemplary system parameters are briefly discussed below.

(a) Slicer Error Calculation:

Slicer error $e_k(n)$ may be expressed as follows.

$$e_k(n) = \hat{s}_k(n) - s_k(n)$$

where "n" denotes a time epoch n, "k" denotes a $k^{th}$ tone, $s_k(n)$ denotes a received signal at FEQ output of the $k^{th}$ tone at the epoch n, and $\hat{s}_k(n)$ denotes a signal estimate or a desired signal of the $k^{th}$ tone at slicer (decision circuit) output at the epoch n.

(b) Phase Detection:

Phase error information, $\theta_k(n)$, may be calculated based on the slicer error. Let $s_k(n) = x_k(n) + j \cdot y_k(n)$ and $\hat{s}_k(n) = \hat{x}_k(n) + j \cdot \hat{y}_k(n)$, then $$e_k(n) \equiv e_{x,k}(n) + j \cdot e_{y,k}(n) = \hat{s}_k(n) - s_k(n), \text{ and}$$

$$\theta_k(n) = \text{imag}\{\text{sign}(\hat{s}_k(n)) \cdot \text{conj}(e_k(n))\}$$

where the operators in the above equations are defined as follows.

$\text{imag}(x + j \cdot y) \equiv y =$ the imaginary part of a complex number, $$\text{sign}(x) \equiv \begin{cases} 1 & \text{if } x > 0 \\ 0 & \text{if } x = 0 \\ -1 & \text{if } x < 0, \end{cases}$$

and conj(x+j·y)≡x−j·y=complex conjugate of a complex number, and j≡√−1.

Figure 3:
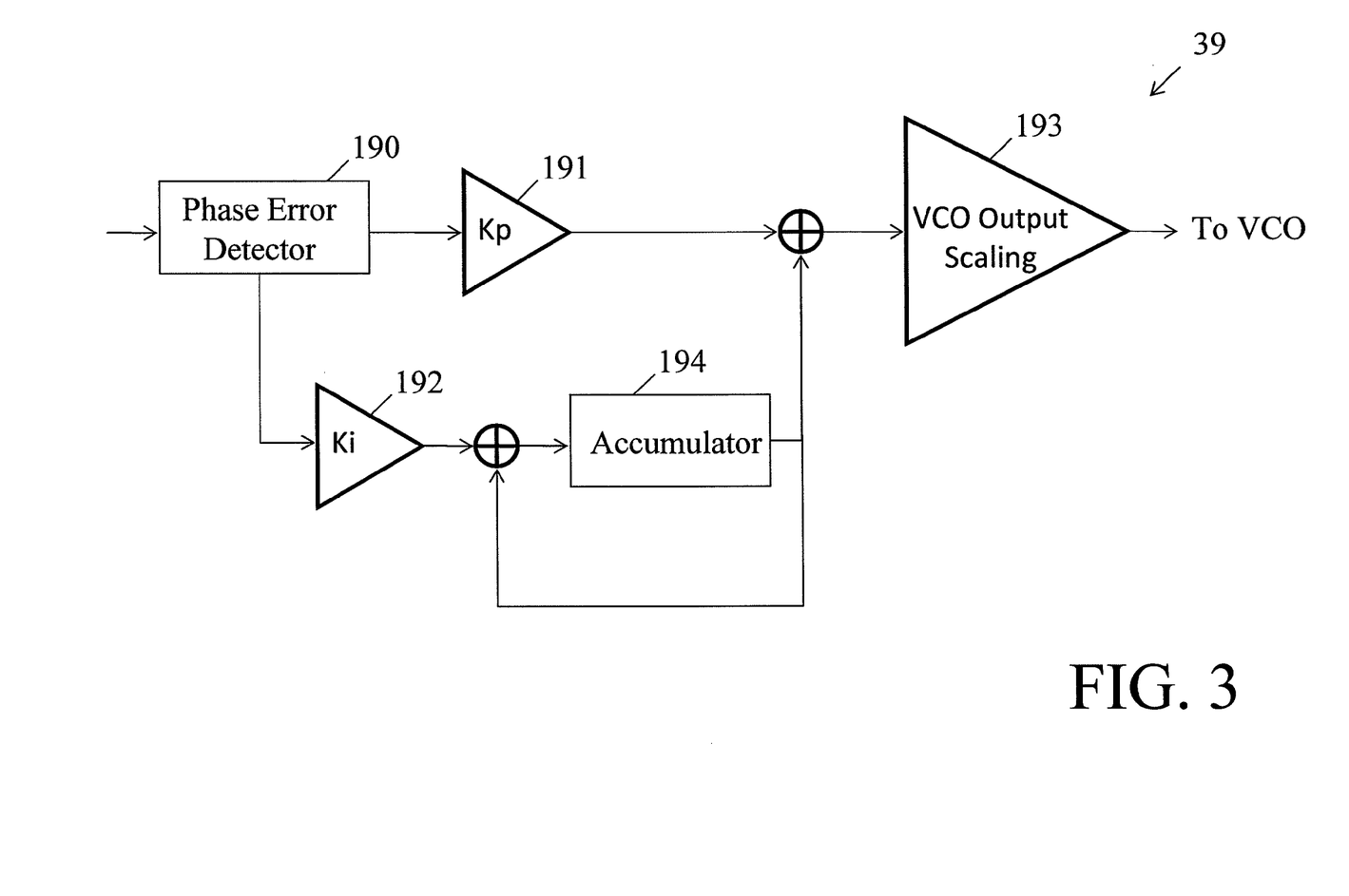
FIG. 3 is a schematic block diagram of an exemplary phase-lock loop (PLL) circuit.

(c) Phase Error Calculation:

The phase error information $\theta_p(n)$ of a pilot tone, for PLL control, may be averaged over time weighted by $K_p$ and $K_i$ on a direct path and an accumulative path (see FIG. 3), respectively, before their summation result is used to drive and adjust the frequency of a voltage-controlled oscillator (VCO) that in return provides timing information to transmitter and receiver of a modem for signal transmission and reception. The local clock $VCO_{ctrl}(n)$ may be expressed as follows.

$$VCO_{ctrl}(n) = K_p \cdot \theta_p(n) + K_i \cdot \Gamma_i(n)$$

where $\Gamma_i(n) = \Gamma_i(n-1) + \theta_p(n)$ =accumulated phase error, $K_p$ and $K_i$ are configurable PLL control parameters (i.e., weighting factors) for the direct path and accumulative path of detected phase error.

(d) FEQ Coefficient Update:

The complex-valued FEQ coefficient of a pilot tone (as well as other tones) may be updated via a suitable adaptive algorithm such as the "least mean square" (LMS) algorithm given below.

$$f_k(n+1) = f_k(n) + \mu_k \cdot e_k(n) \cdot \text{conj}\{r_k(n)\}$$

with a constraint that the imaginary part of $f_k(n+1)$ is fixed to zero, i.e., the imaginary part of the FEQ coefficient corresponding to the reference signal is virtually not updated, and where $\mu_k$ denotes the adjustment step size for FEQ coefficient update, $f_k(n)$ denotes FEQ coefficient corresponding the selected $k^{th}$ tone at the time epoch n, and $r_k(n)$ represents the FEQ input signal (i.e., FFT output signal with or without scaling).

In other examples, similar types of timing adjustment or coefficient adaptation mechanisms may be used in DMT-based receivers. It can be seen from the above equations for either timing adjustment or FEQ coefficient adaptation that, if any strong impulse noise occurs in an error term for their associated adjustment or adaptation, quality of system timing and FEQ coefficients may significantly deviate from their optimum values. In worse cases where impulse noise is so frequent that the parameters in PLL, DEC or FEQ may diverge in their adaptation process, the link may eventually break down.

Referring again to FIG. 1A, in one example according to the present invention, the controller 18 may calculate the power of a signal from an analog front end (AFE) such as an analog-to-digital converter (ADC) at an input of the digital receiver filter 11, and compare the power with a threshold. If the power is equal to or greater than the threshold, which means that impulse noise is detected, the controller 18 may issue a control signal, as shown in dotted lines, to the FEQ 15, a digital echo canceller (DEC) 17 and a phase-lock loop (PLL) 19 to thereby disable the FEQ 15, DEC 17 and PLL 19. For example, training of TEQ coefficients, adaptation or update of FEQ and DEC coefficients, update of timing adjustment control derived from PLL output, and accumulation of phase/frequency error, if any, in PLL may be disabled. On the other hand, if no impulse noise is detected, the control signal may enable the adaptation of the system parameters in the FEQ 15, DEC 17 and PLL 19.

In another example, the controller 18 may calculate the power of a signal at an input of the TEQ 12 or at an output of the digital receiver filter 11 and compare the power with a threshold. Similarly, if the power is equal to or greater than the threshold, the controller 18 may issue a control signal to disable the FEQ 15, DEC 17 and PLL 19.

In still another example, the controller 18 may calculate the power of a signal at an output of the TEQ 12 and compare the power with a threshold. If the power is equal to or greater than the threshold, the controller 18 may issue a control signal to disable the FEQ 15, DEC 17 and PLL 19.

In yet another example, the controller 18 may calculate at least one of the signal power at the filter input, TEQ input or TEQ output and compare each of the at least one signal power with a threshold corresponding to the each signal power. If one of the at least one signal power is equal to or greater than its corresponding threshold, the controller 18 may issue a control signal to disable the FEQ 15, DEC 17 and PLL 19.

The above-mentioned thresholds for the detection of impulse noise in the time domain may depend on circuit design. For example, the TEQ 12 may include an amplifier circuit so that the threshold for the TEQ output may be multiple times the thresholds for the filter input and TEQ input. Furthermore, the controller 18 may include a power calculation module (not shown), in either firmware, hardware or a combination thereof, to calculate the signal powers. In an exemplary algorithm for power calculation in the time domain, at a time epoch n, the signal power of a sliding window of "M" samples may be defined as:

$$P_s(n) = \sum_{i=1}^{M} x(n-i)^2,$$

where x(i) denotes a signal sample at a time epoch i.

If $P_s(n) > P_{IMP\_th}$, a pre-determined threshold, then impulse noise associated with a received signal is detected. Otherwise, no impulse noise is detected.

Figure 1B:
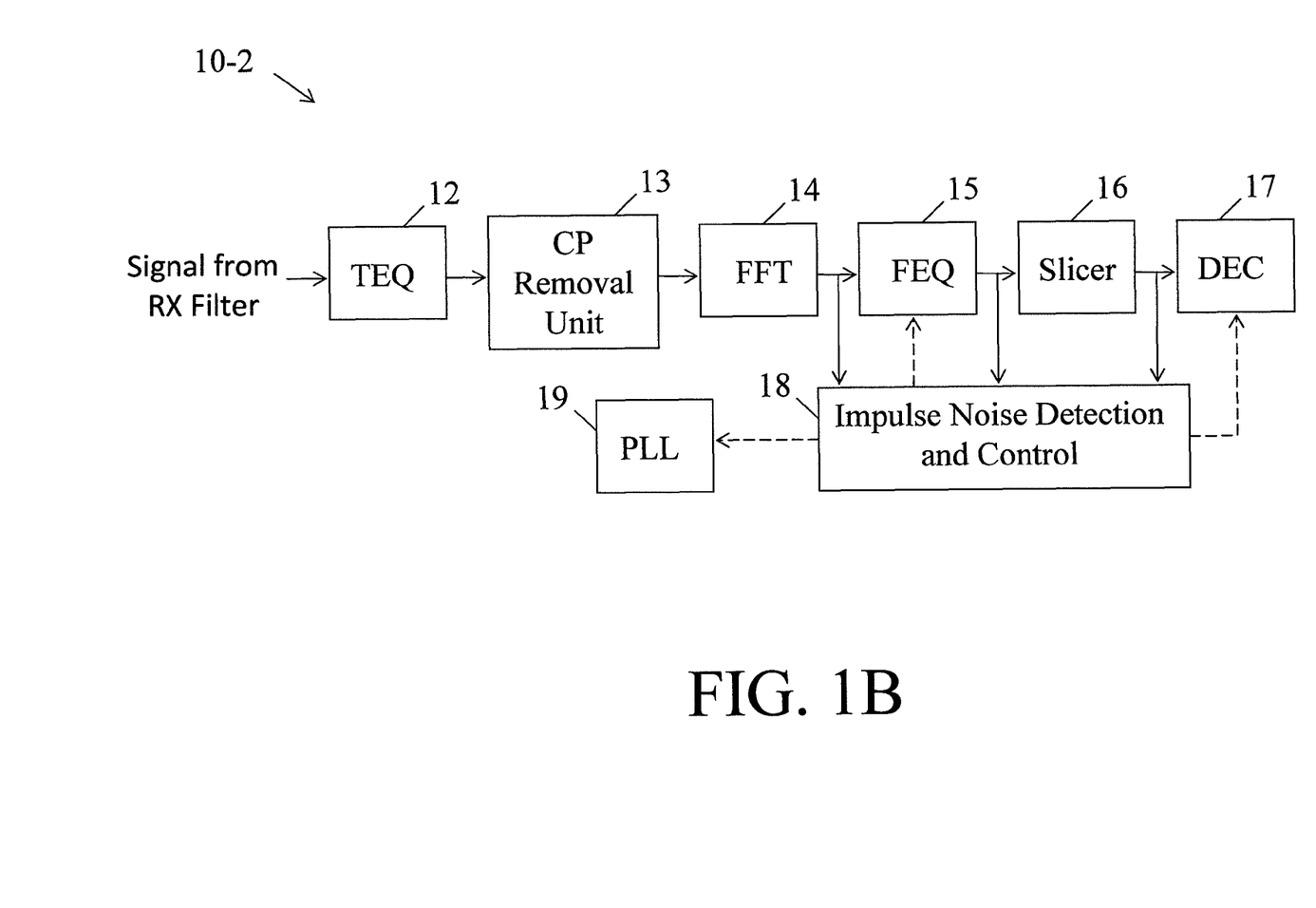
FIG. 1B is a block diagram of an apparatus for impulse noise mitigation in the frequency domain in a multi-carrier communication system in accordance with an example of the present invention.

FIG. 1B is a block diagram of an apparatus 10-2 for impulse noise mitigation in the frequency domain in a multi-carrier communication system in accordance with an example of the present invention. Referring to FIG. 1B, the apparatus 10-2 may be similar to the apparatus 10-1 described and illustrated with reference to FIG. 1A except that, for example, the controller 18 may be configured to detect impulse noise in the frequency domain and, when impulse noise is detected, disable the adaption or update of system parameters so that the impact of impulse noise on the system parameters may be alleviated. In one example according to the present invention, the controller 18 may calculate the power of a signal at an output of the FFT module 14 and compare the power with a threshold. If the power is equal to or greater than the threshold, the controller 18 may issue a control signal to the FEQ 15, DEC 17 and PLL 19 to thereby disable the FEQ 15, DEC 17 and PLL 19. For example, adaptation or update of FEQ and DEC coefficients may be disabled. Furthermore, if the signal is a pilot tone and the signal power is equal to or greater than the threshold, the PLL output for timing adjustment control may be disabled.

In another example, the controller 18 may calculate the power of a signal at an output of the FEQ 15 or at an input of a slicer 16 and compare the power with a threshold. If the power is equal to or greater than the threshold, the controller 18 may issue a control signal to disable the FEQ 15, DEC 17 and PLL 19.

In still another example, the controller 18 may calculate the power of a signal at an output of the slicer 16 and compare the power with a threshold, wherein the slicer 16 may serve as a decision device and the signal at the slicer output may represent a decision error. If the power is equal to or greater than the threshold, the controller 18 may issue a control signal to disable the FEQ 15, DEC 17 and PLL 19.

In yet another example, the controller 18 may calculate at least one of the signal power at the FFT output, FEQ output or slicer output and compare each of the at least one signal power with a threshold corresponding to the each signal power. If one of the at least one signal power is equal to or greater than its corresponding threshold, the controller 18 may issue a control signal to disable the FEQ 15, DEC 17 and PLL 19.

The above-mentioned thresholds for the detection of impulse noise in the frequency domain may depend on circuit design. Furthermore, the comparison between a signal power and a threshold in the frequency domain may be made on a single tone basis or a multi-tone basis. In an exemplary algorithm for power calculation in the frequency domain, the total power sum of decision error (at FEQ/slicer output) of selected tones in the $n^{th}$ DMT symbol can be defined as:

$$P_E(n) = \sum_{i \in \{selected\ tones\}} e_i(n)^2$$

If $P_E(n) > P_{E\_th}$, a predetermined threshold, then impulse noise in the current $n^{th}$ DMT symbol is detected. Otherwise, no impulse noise is detected.

In another exemplary algorithm for power calculation in the frequency domain, the signal power sum of selected tones at the FFT output can be defined as:

$$P_F(n) = \sum_{i \in \{selected\ tones\}} r_i(n)^2$$

where $r_i(n)$ denotes the $i^{th}$ (selected) tone signal observed at the FFT output of the $n^{th}$ DMT symbol. The selected tones may include but are not limited to those tones that carry no signal information and power. Accordingly, if there's no noise, the signal should be null.

If $P_F(n) > P_{F\_th}$, a predetermined threshold based on nominal received signal power, then impulse noise in the current $n^{th}$ DMT symbol is detected. Otherwise, no impulse noise is detected.

In still another exemplary algorithm for power calculation in the frequency domain, the power of instant error of a number of tones, $N(n)$, may be defined as:

$$N(n) = \sum_{i \in \{selected\ tones\}} \frac{1}{2} \cdot (\text{sign}[e_i(n)^2 - P_{TE\_imp\_th}(i)] + 1)$$

where $$\text{sign}[x] \equiv \begin{cases} 1 & \text{when } x > 0 \\ 0 & \text{when } x = 0 \\ -1 & \text{when } x < 0, \end{cases}$$

and $P_{TE\_imp\_th}(i)$=threshold of tone error power (which may be measured at slicer or decision device output) associated with the $i^{th}$ tone for impulse noise detection.

The presence of an impulse noise in an $n^{th}$ DMT symbol is detected when $N(n)$ is greater than $N_{Th}$, a pre-specified threshold for a number of tones whose instant error power exceed their associated tone error power thresholds. The tone error power threshold $P_{TE\_imp\_th}(i)$ (associated with each tone) and the threshold $N_{Th}$ for impulse noise detection may be updated in initialization and showtime stages depending on desired link quality and reliability of such detection.

Figure 1C:
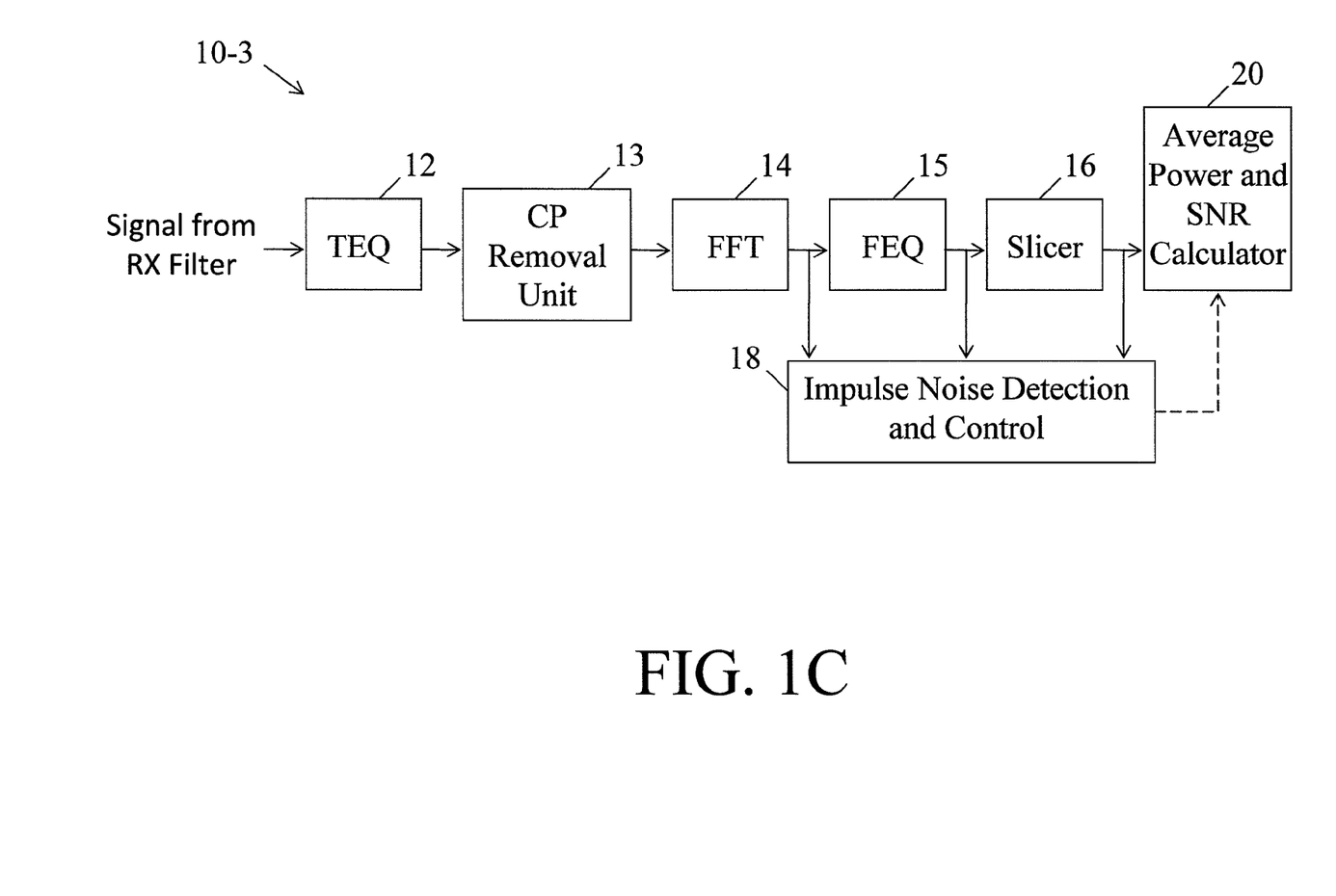
FIG. 1C is a block diagram of an apparatus for impulse noise mitigation in the frequency domain in a multi-carrier communication system in accordance with another example of the present invention.

FIG. 1C is a block diagram of an apparatus 10-3 for impulse noise mitigation in the frequency domain in a multi-carrier communication system in accordance with another example of the present invention. Referring to FIG. 1C, the apparatus 10-3, which may be similar to the apparatus 10-2 described and illustrated with reference to FIG. 1B, may further include a calculator 20. The calculator 20 may be configured to calculate an average power and signal-to-noise-ratio (SNR) value of a predetermined number of tones. When impulse noise is detected in the frequency domain, the controller 18 may issue a control signal, as shown in dotted lines, to the calculator 20 to thereby disable the calculator 20. Specifically, the calculator 20 may be disabled from calculating the average tone error power and SNR for the slicer error values of all tones. As a result, the tone error power and SNR of all tones at the current epoch or current symbol period may be kept the same as their respective values at a previous epoch or symbol period. Since SNR values may typically be used for noise margin monitoring, bit-loading arrangement or other DSP/control purpose in signal reception, disabling the SNR calculation in the presence of impulse noise may facilitate line quality monitoring and link quality maintenance.

Moreover, if instant error power of a tone at a time epoch n is larger than its corresponding threshold, the error power of the tone may be skipped in the average error power and SNR calculations. The controller 18 may be configured to set a flag with a value "1" when impulse noise or significant instant error is detected.

Figure 1D:
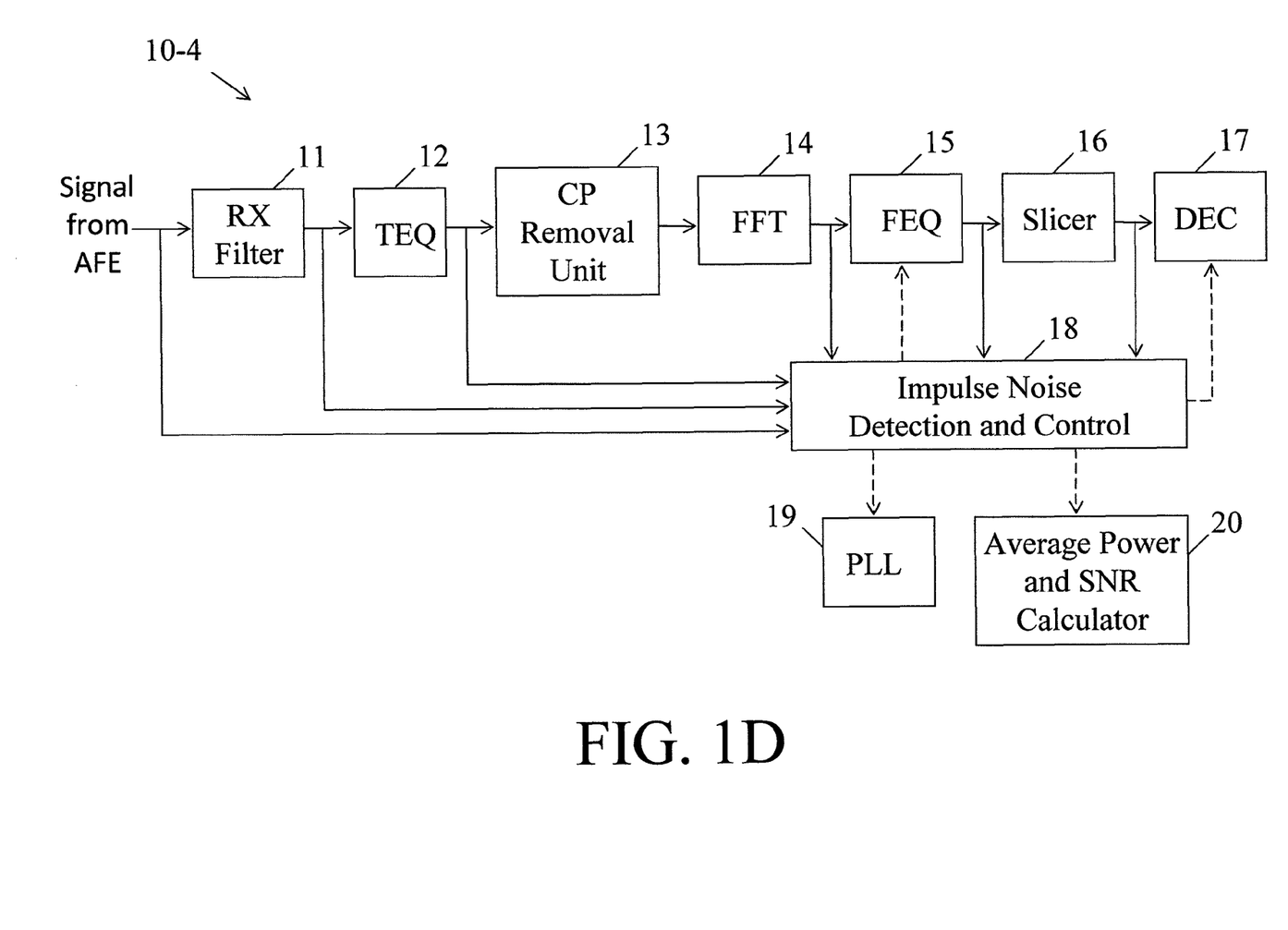
FIG. 1D is a block diagram of an apparatus for impulse noise mitigation in the time domain and frequency domain in a multi-carrier communication system in accordance with an example of the present invention.

FIG. 1D is a block diagram of an apparatus 10-4 for impulse noise mitigation in the time domain and frequency domain in a multi-carrier communication system in accordance with an example of the present invention. Referring to FIG. 1D, the apparatus 10-4 may be similar to those described and illustrated with reference to FIGS. 1A to 1C and may be configured to detect impulse noise in the time domain and frequency domain. Specifically, impulse noise detection may be made in the time domain at filter input, filter output or TEQ output and/or in the frequency domain at FFT output, FEQ output or slicer output. When the power or amplitude of a received signal in either the time domain at the filter input/output or TEQ output or in the frequency domain at the FFT output or FEQ output, or the power of a decision error signal at slicer output associated with a single tone or a multiple of selected tones is equal to or greater than a threshold, impulse noise is detected in the current symbol. The controller 18 may disable the training/updating of DSP modules, which may include but are not limited to, for example, training of TEQ/FEQ/DEC coefficients in Initialization or adaptation of FEQ/DEC coefficients in Showtime so as to mitigate impulse noise effects on system performance.

Figure 2A:
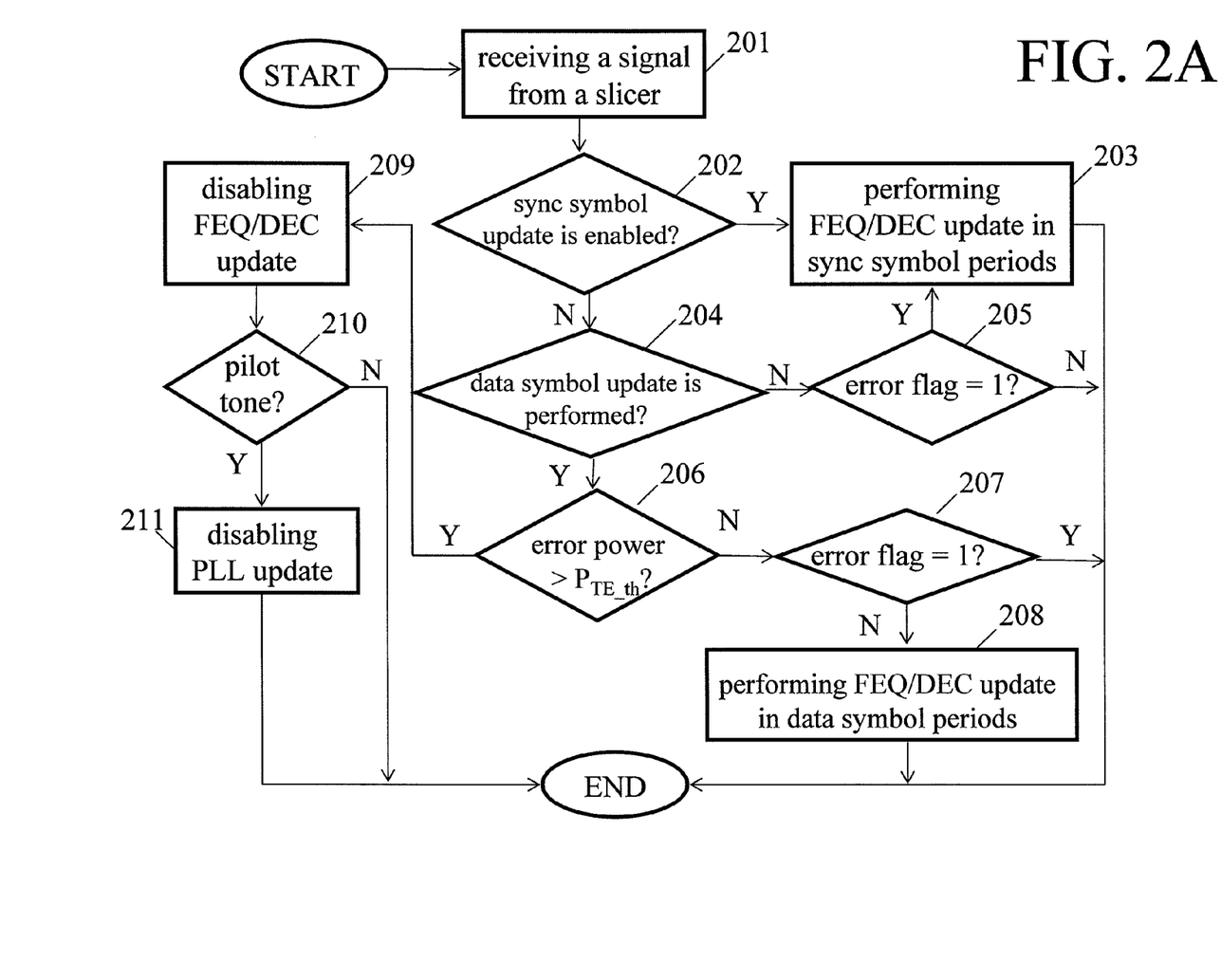
FIG. 2A is a flow diagram illustrating a method of impulse noise mitigation in a multi-carrier communication system in accordance with an example of the present invention.

FIG. 2A is a flow diagram illustrating a method of impulse noise mitigation in a multi-carrier communication system in accordance with an example of the present invention. Referring to FIG. 2A, at step 201, a signal associated with a tone may be output from a slicer, for example, the slicer 16 illustrated in FIG. 1D. In the multi-carrier communication system, which employs the DMT scheme, signals are composed of 256 discrete analog sub-channels, or tones, each being approximately 4.3 kHz wide but transmitted on different frequencies. The tone relates to the frequency on which the signal is transmitted. Furthermore, each sub-channel within a specific frequency range is responsible for either upstream or downstream data. However, not all channels are actually usable for the transmission of data. For example, some tones are not used such as the pilot tone, while some tones are reserved for voice or to prevent overlap of the different signal types.

The signal from the slicer may be updated in a synchronization (hereinafter "sync") symbol period or a data symbol period. ADSL uses the superframe structure. Each superframe is composed of 68 data frames and one sync frame, which are modulated onto 69 symbols over a time duration of approximately 17 ms. A sync frame may refer to a frame with deterministic content known to the receiver and transmitter, which is modulated onto a sync symbol.

At step 202, it is determined whether the feature "sync symbol update" is enabled. If confirmative, at step 203, adaptation or updating of all FEQ and DEC coefficients is performed in sync symbol periods. If not, the FEQ or DEC coefficient associated with a tone may be updated in a data symbol period.

Accordingly, at step 204, it is determined whether data symbol update is performed. If not, at step 205, it is determined whether an error flag associated with the tone is set, i.e., having a value equal to "1", which may mean that the signal associated with the current tone has an error. Setting and clearing an error flag associated with a tone will be described later by reference to FIG. 2B. If the error flag is set, the FEQ/DEC coefficient associated with the tone is updated or "recovered" in a sync symbol period at step 203 even though the feature "sync symbol update" is not enabled. As a result, system performance may be further enhanced. Specifically, even though most impulse noise effects are inhibited or mitigated, some FEQ coefficients may still deviate much from their optimum values due to surge of interference/noise or frequent presence of impulse type noise that may not be detected by impulse noise detection circuits. In that case, these corrupted FEQ coefficients may be recovered on a tone (or group) basis during sync symbol periods.

If data symbol update is to be performed, at step 206, it is determined whether the power of an instant error associated with the signal from the slicer is greater than a predetermined threshold, $P_{TE\_t}$. If not, at step 207, it is determined whether the error flag associated with the tone is set. If not set, at step 208, the FEQ/DEC coefficient associated with the tone is updated during a data symbol period.

If at step 206 it is determined that the instant error power is greater than the predetermined threshold $P_{TE\_th}$, then at step 209, the FEQ/DEC update is disabled and thus no FEQ/DEC coefficient associated with the tone is updated. That is, no matter whether impulse noise is detected, the training of FEQ and/or DEC coefficient in Initialization or the adaptation of FEQ and/or DEC coefficient in Showtime may be disabled if the instant error power associated with a tone at slicer output exceeds its associated threshold.

Next, at step 210, it is determined whether the tone is a pilot tone. If confirmative, at step 211, the PLL update is disabled by, for example, setting an input phase error to zero so that the instant error may not be accumulated in the PLL.

In the present example, a single tone signal at the slicer output is discussed. In other examples, however, several tones may be grouped together such that adaptation of their coefficients may be disabled on a group basis if the instant error power of one or more tones in the group exceeds their associated thresholds.

Moreover, in one example, either during Initialization or Showtime, tone error power thresholds for FEQ/DEC coefficient adaptation control and impulse noise detection associated with each tone may be configured to constants. In another example, each of these thresholds may be adaptively determined based on its average error power observed at slicer output. For example, these tone error power thresholds for each tone may be scaled values of its average error power measured in REVERB states, Medley state or Showtime. Likewise, thresholds $P_{TAE\_th\_H}$ or $P_{TAE\_th\_L}$ associated with each tone for its error flag "set" and "clear" may be determined in a similar fashion.

Furthermore, to further reduce the impact of impulse noise effects on FEQ or DEC coefficients, in one example, the FEQ or DEC coefficients may be updated periodically every M symbols in sync symbol periods if the "sync symbol update" feature is enabled or every N symbols in data symbol periods if "sync symbol update" feature is not enabled when no impulse noise is detected or no instant error is found at slicer output. The values of M and N may be re-configurable or, if necessary, may be changed from time to time depending on impulse noises characteristics.

Alternatively, since impulse noise may not occur consecutively, in another example, the FEQ or DEC coefficients may be updated for K consecutive symbol periods after an impulse noise fades away and before the next impulse noise occurs, wherein K is a configurable value. That is, when a detected impulse noise is removed, the FEQ or DEC coefficients may be updated for K consecutive symbol periods until another impulse noise is detected.

Figure 2B:
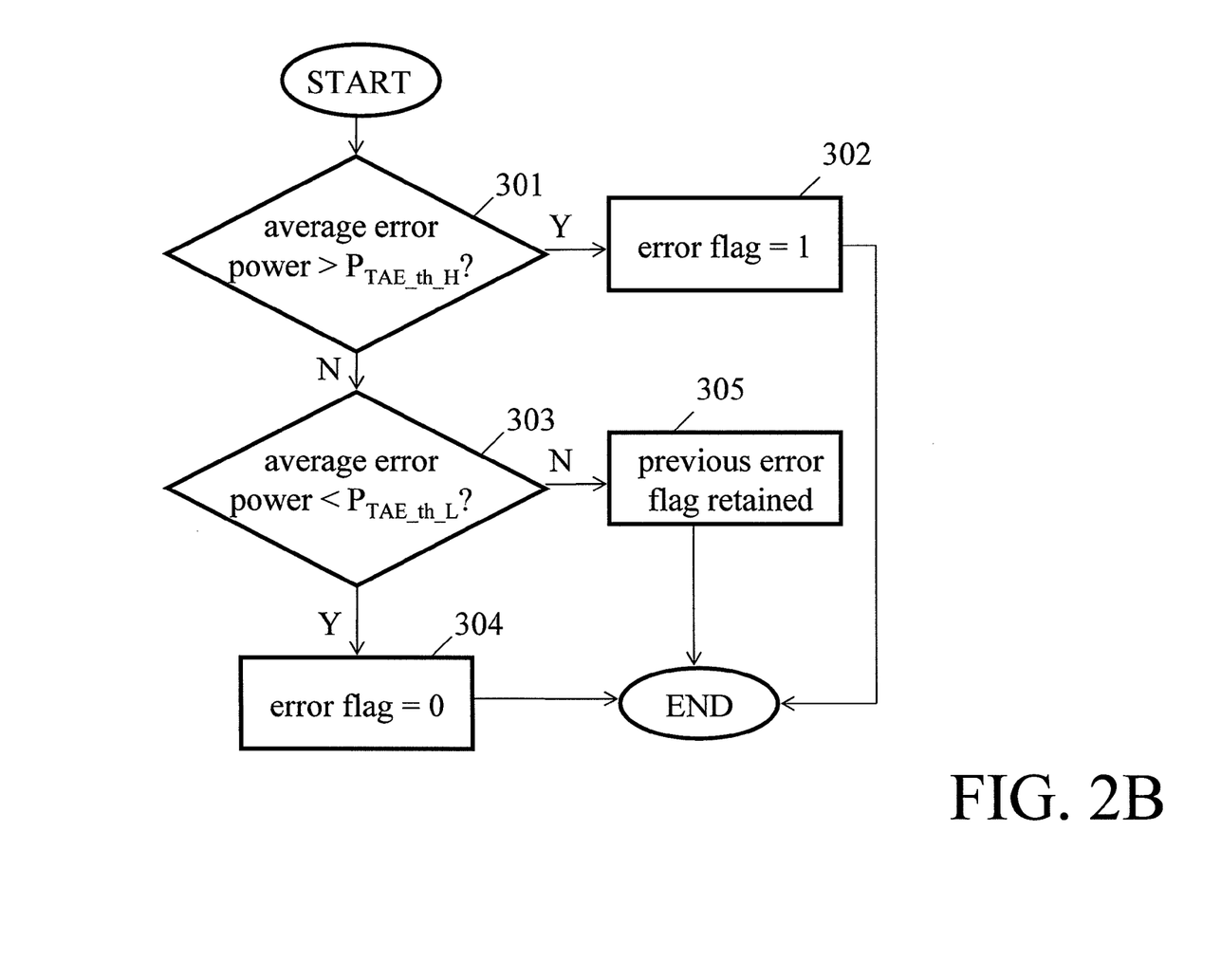
FIG. 2B is a flow diagram illustrating a method of determining the state of a tone in accordance with an example of the present invention.

FIG. 2B is a flow diagram illustrating a method of determining the state of a tone in accordance with an example of the present invention. Referring to FIG. 2B, at step 301, it is determined whether an average error power associated with a tone is greater than a first threshold, $P_{TAE\_th\_H}$. If confirmative, at step 302, the error flag associated with the tone is set with a value "1".

If not, at step 303, it is determined whether the average error power associated with the tone is smaller than a second threshold, $P_{TAE\_th\_L}$. If confirmative, at step 304, the error flag associated with the tone is cleared with a value "0".

At step 305, if the average error power associated with the tone is between the first threshold $P_{TAE\_th\_H}$ and the second threshold $P_{TAE\_th\_L}$, the previous state of the error flag associated with the tone is retained. In one example according to the present invention, the state of the flag may be controlled, i.e., to set, clear or retain, by the controller 18 illustrated in FIGS. 1A to 1D.

Accordingly, for a specific tone, its FEQ coefficient to be either adaptively updated in normal condition, i.e., data symbol periods or recovered in sync symbol periods is controlled by an error flag and a state machine illustrated in FIG. 2B. When the average error power associated with a tone is greater than the first threshold $P_{TAE\_th\_H}$, its associated error flag is set, and its FEQ coefficient is updated, i.e., recovered, during sync symbol periods. When the tone average error power becomes smaller than the second threshold $P_{TAE\_th\_L}$ the error flag is cleared and its FEQ coefficient may be updated in normal data symbol periods.

Similarly, when the error flag associated with a tone is set, the adaptation of its DEC coefficient may be disabled until the error flag is cleared, and then normal adaptation of its DEC coefficient may be activated.

FIG. 3 is a schematic block diagram of an exemplary phase-lock loop (PLL) circuit 39. Referring to FIG. 3, the PLL 39, which may be similar to the PLL 19 illustrated in FIGS. 1A, 1B and 1D, may include a phase error detector 190, a first amplifier 191 with a first weight $K_p$, a second amplifier 192 with a second weight $K_i$, a third amplifier 193 and an accumulator 194. As previously discussed, $K_p$ and $K_i$ are configurable PLL control parameters i.e., weighting factors, for the direct path and accumulative path of detected phase error, respectively. When a significant instant error is detected, by setting the phase error, for input to the phase error detector 190, to zero, the significant instant error is not accumulated in the PLL 39.

In either Initialization or Showtime state, the PLL 39 is not updated if the instant tone error in the pilot tone of a symbol is greater than its corresponding error power threshold $P_{TE\_th}$ (step 206 in FIG. 2A). Furthermore, if the presence of impulse noise in the current symbol is detected either in the time domain or frequency domain, the PLL control word is not updated no matter whether the instant error power in the pilot tone is greater than the threshold $P_{TE\_th}$.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A method of noise mitigation in a multi-carrier communication system,
the method comprising:
receiving a signal from a decision device;
determining whether synchronization symbol update is enabled;
updating at least one of frequency-domain equalizer (FEQ) coefficients or digital echo canceller (DEC) coefficients in synchronization symbol periods if the synchronization symbol update is enabled;
determining whether data symbol update is performed if the synchronization symbol update is not enabled;
determining whether a flag associated with the signal is set if the data symbol update is not performed; and
updating at least one of FEQ or DEC coefficients associated with the signal in synchronization symbol periods if the flag is set.

2. The method of claim 1, wherein the signal includes one of a single-tone signal and a multi-tone signal.

3. The method of claim 1 further comprising:
determining whether a power of instant error associated with the signal exceeds a threshold if the data symbol update is to be performed;
determining whether a flag associated with the signal is set if the power of instant error is smaller than the threshold; and
updating at least one of the FEQ and DEC coefficients associated with the signal in data symbol periods if the flag is not set.

4. The method of claim 3 further comprising:
disabling update of the FEQ and DEC coefficients if a power of instant error exceeds the threshold.

5. The method of claim 4 further comprising:
determining whether the signal is a pilot tone signal if the power of instant error exceeds the threshold; and
disabling update of phase-lock loop (PLL) coefficients if the signal is a pilot tone signal.

6. The method of claim 5, wherein disabling update of PLL coefficients includes sending a zero phase error to the PLL.

7. The method of claim 1 further comprising:
calculating an average of a power of error associated with the signal;
determining whether the average power exceeds a first threshold; and
setting the flag if the average power exceeds the first threshold.

8. The method of claim 7 further comprising:
determining whether the average power exceeds a second threshold if the average power is smaller than the first threshold; and
clearing the flag if the average power is smaller than the second threshold.

9. A method of noise mitigation in a multi-carrier communication system,
the method comprising:
receiving a signal from a decision device;
identifying that synchronization symbol update is not enabled;
determining whether a flag associated with the signal is set if data symbol update is not performed;
updating at least one of frequency-domain equalizer (FEQ) coefficients or digital echo canceller (DEC) coefficients associated with the signal in synchronization symbol periods if the flag is set;
determining whether a power of instant error associated with the signal exceeds a threshold if the data symbol update is to be performed;
determining whether the flag associated with the signal is set if the power of instant error is smaller than the threshold; and
updating at least one of FEQ or DEC coefficients associated with the signal in the data symbol periods if the flag is not set.

10. The method of claim 9 further comprising:
disabling update of the FEQ and DEC coefficients if the power of instant error exceeds the threshold.

11. The method of claim 9 further comprising:
determining whether the signal is a pilot tone signal if the power of instant error exceeds the threshold; and
disabling update of phase-lock loop (PLL) coefficients if the signal is a pilot tone signal.

12. The method of claim 11, wherein disabling update of PLL coefficients includes sending a zero phase error to the PLL.

13. The method of claim 9 further comprising:
calculating an average of a power of error associated with the signal;

determining whether the average power exceeds a first threshold; and setting the flag if the average power exceeds the first threshold.

14. The method of claim 13 further comprising:

determining whether the average power exceeds a second threshold if the average power is smaller than the first threshold; and clearing the flag if the average power is smaller than the second threshold.

15. A method of noise mitigation in a multi-carrier communication system including a filter, a time-domain equalizer (TEQ), a fast Fourier transform (FFT) module, a frequency-domain equalizer (FEQ) and a slicer, the method comprising:

calculating a power of signal at at least one of an input of the filter, an input of the TEQ, an output of the TEQ, an output of the FFT module, an output of the FEQ or an output of the slicer;

comparing the power of the at least one signal with a respective threshold;

determining that impulse noise is detected when at least one of the power of the at least one signal exceeds its respective threshold;

disabling adaptation of system parameters in at least one of the FEQ, a phase-lock loop (PLL) or a digital echo canceller (DEC) when impulse noise is detected;

identifying that synchronization symbol update is not enabled;

determining whether a flag associated with the slicer output is set if data symbol update is not performed; and updating at least one of FEQ coefficients or DEC coefficients associated with the slicer output in synchronization symbol periods if the flag is set.

16. The method of claim 15, wherein the multi-carrier communication system includes a calculator coupled with the slicer to calculate an average power and signal-to-noise-ratio (SNR) value of a number of tones, the method further comprising:

disabling the calculator from calculating an average tone error power and SNR for slicer error of all tones when impulse noise is detected.

17. The method of claim 15 further comprising:

determining whether a power of instant error associated with the slicer output exceeds a threshold if the data symbol update is to be performed;

determining whether the flag associated with the slicer output is set if the power of instant error is smaller than the threshold; and updating at least one of FEQ or DEC coefficients associated with the slicer output in the data symbol periods if the flag is not set.

18. The method of claim 17 further comprising:

updating the FEQ or DEC coefficients periodically every M symbols in sync symbol periods if synchronization symbol update is enabled; and updating the FEQ or DEC coefficients periodically every N symbols in data symbol periods if synchronization symbol update is not enabled when the flag is not set, M and N being natural numbers.

19. The method of claim 17 further comprising:

updating the FEQ or DEC coefficients periodically for K consecutive symbol periods until impulse noise is detected, K being a natural number.

* * * * *